Dec. 11, 1956  L. JOHANSSON  2,773,333
MACHINE TOOL, ESPECIALLY GRINDING MACHINES FOR
MACHINING ROTATING WORK PIECES
Filed Sept. 25, 1953  4 Sheets-Sheet 1

Inventor:
Lennart Johansson
by his Attorneys
Howson & Howson

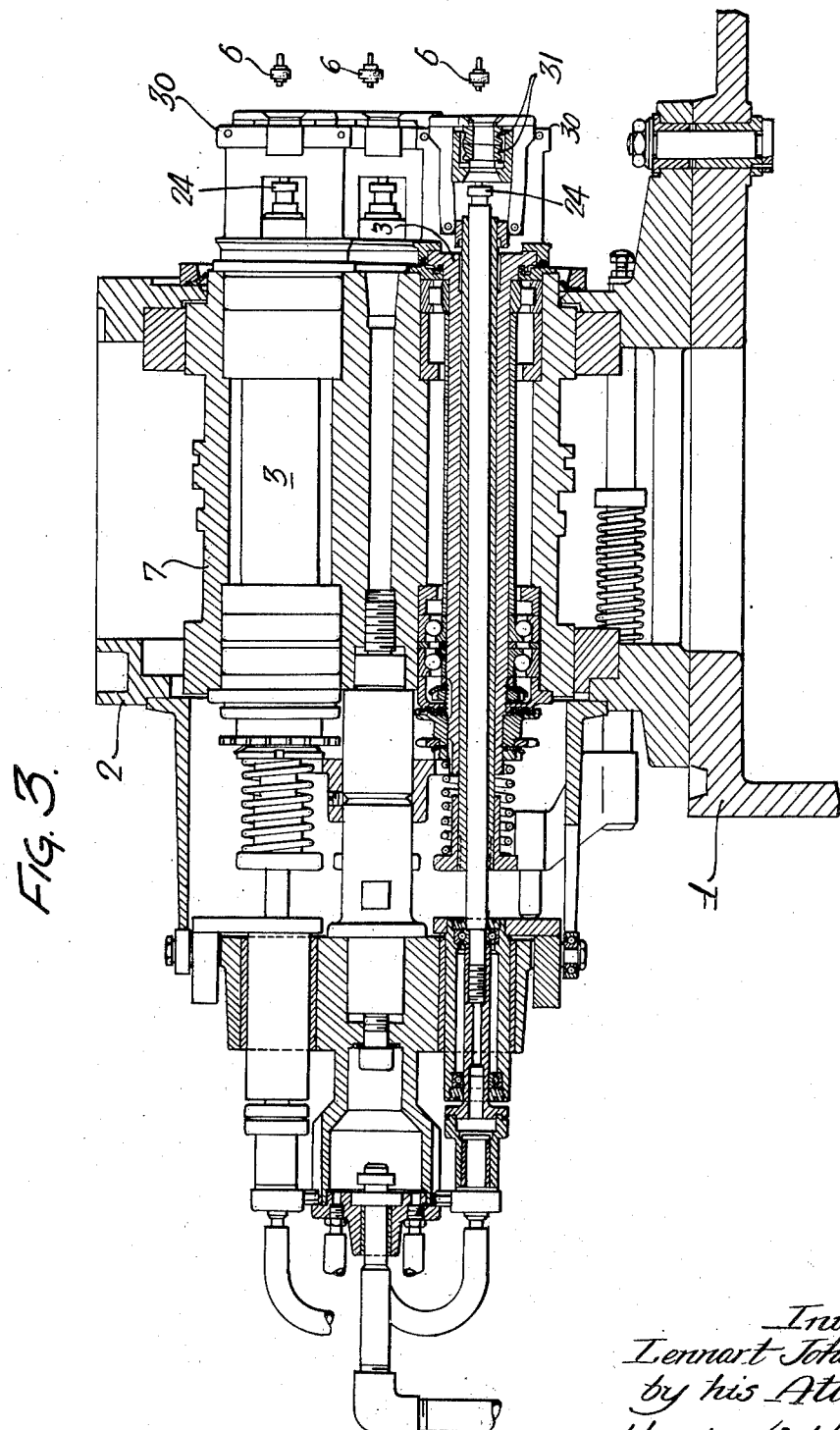

Dec. 11, 1956  L. JOHANSSON  2,773,333
MACHINE TOOL, ESPECIALLY GRINDING MACHINES FOR
MACHINING ROTATING WORK PIECES
Filed Sept. 25, 1953  4 Sheets-Sheet 3

Inventor:
Lennart Johansson
by his Attorneys
Howson & Howson

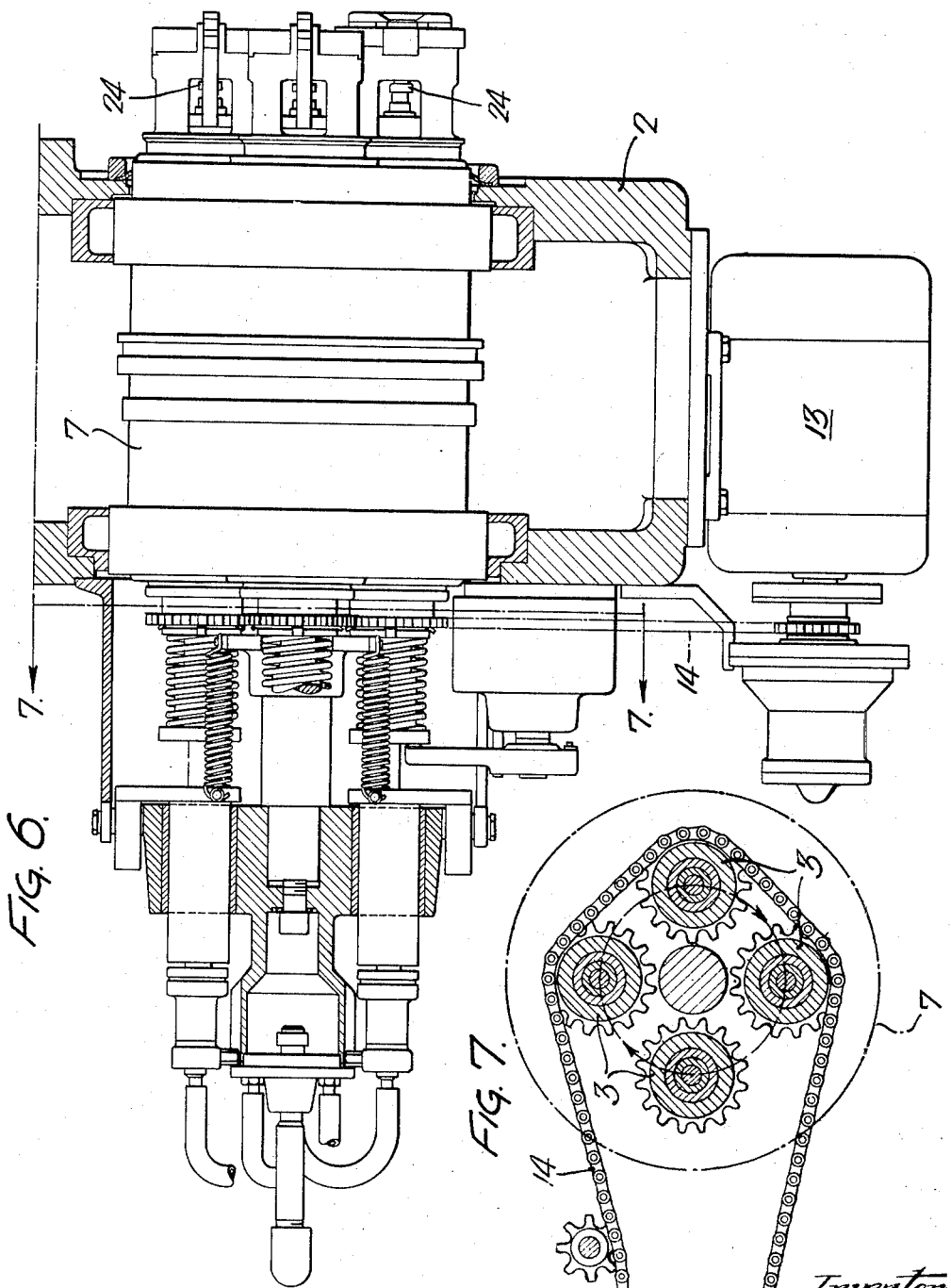

United States Patent Office 2,773,333
Patented Dec. 11, 1956

2,773,333

MACHINE TOOL, ESPECIALLY GRINDING MACHINES FOR MACHINING ROTATING WORK PIECES

Lennart Johansson, Goteborg, Sweden, assignor to Aktiebolaget Svenska Kullagerfabriken, Goteborg, Sweden, a corporation of Sweden Application September 25, 1953, Serial No. 382,413

Claims priority, application Sweden September 29, 1952

4 Claims. (Cl. 51—53)

A general rule, when working on rotating work pieces with chip cutting machine tools, is that, in order to attain exact dimensions and satisfactory surface finish, it is necessary that the depth of the cut in the last operation must be very small. Thus, in grinding a work piece, it is in many cases necessary to grind repeatedly with successively diminishing alteration of the diameter for each cut. Further, it is often advisable to use for the final operation a grinding wheel of another quality than for the previous grinding operations.

Because of the above mentioned requirements it may in some cases be difficult to carry out the work in a rational manner. The present invention relates to a machine tool, especially a grinding machine, for working upon rotating work pieces, which in a simple manner, makes it possible to attain great productive capacity and at the same time, great precision. The machine according to the invention is characterized mainly thereby, that it is provided with a plurality of work spindles mounted in the same carriage, a plurality of tool holders mounted on a tool carriage in positions fixed relative each other for simultaneously working on a plurality of work pieces carried on said spindles, means for bringing each work piece in turn into working position with reference to each tool and means for effecting a relative feeding motion between the work pieces and tools, said feeding motion being common to all of said work pieces and tools.

Figure 2:
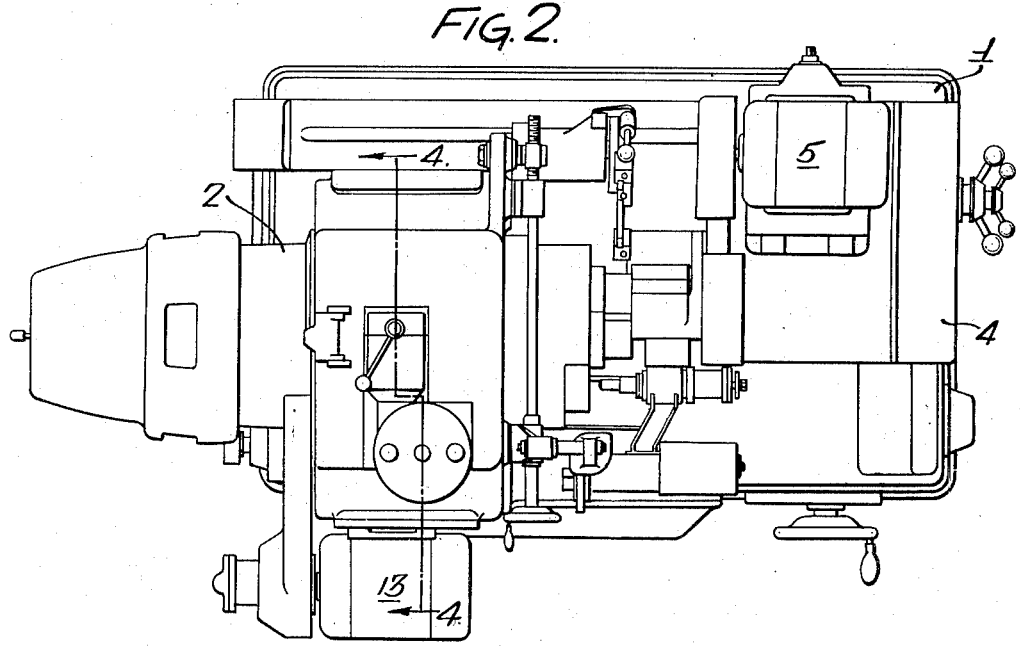
Figure 1:
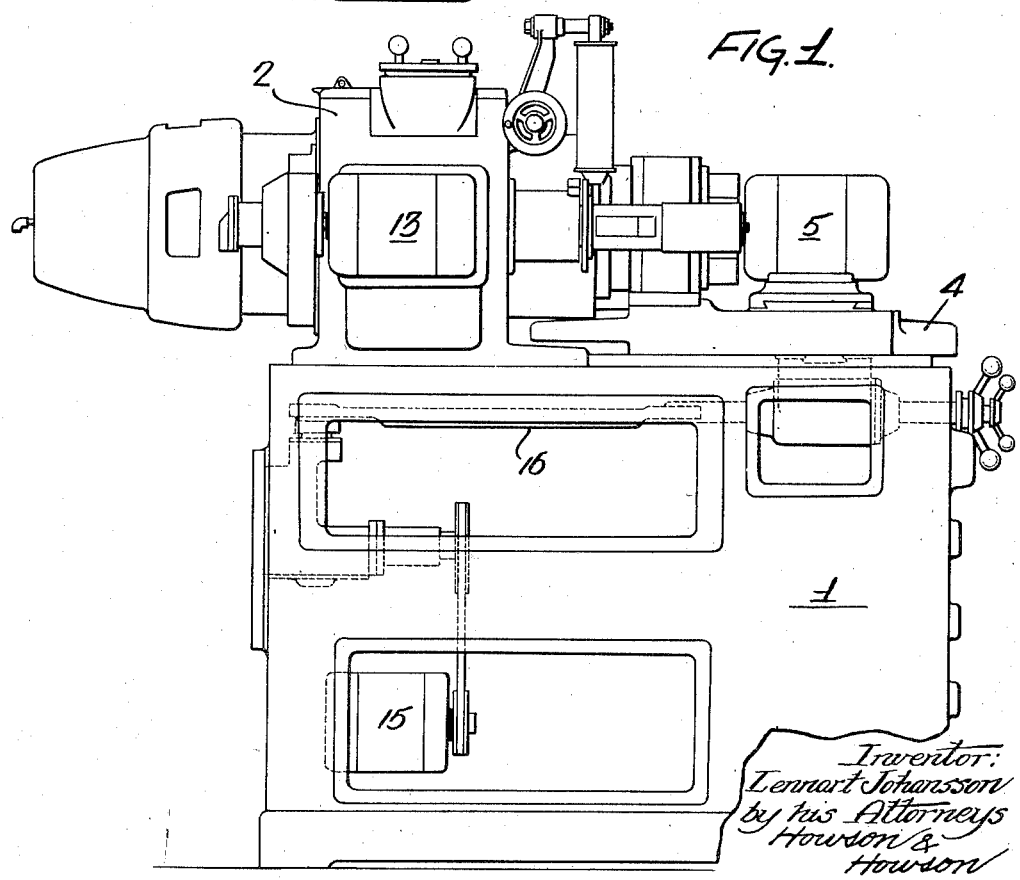
Figure 4:
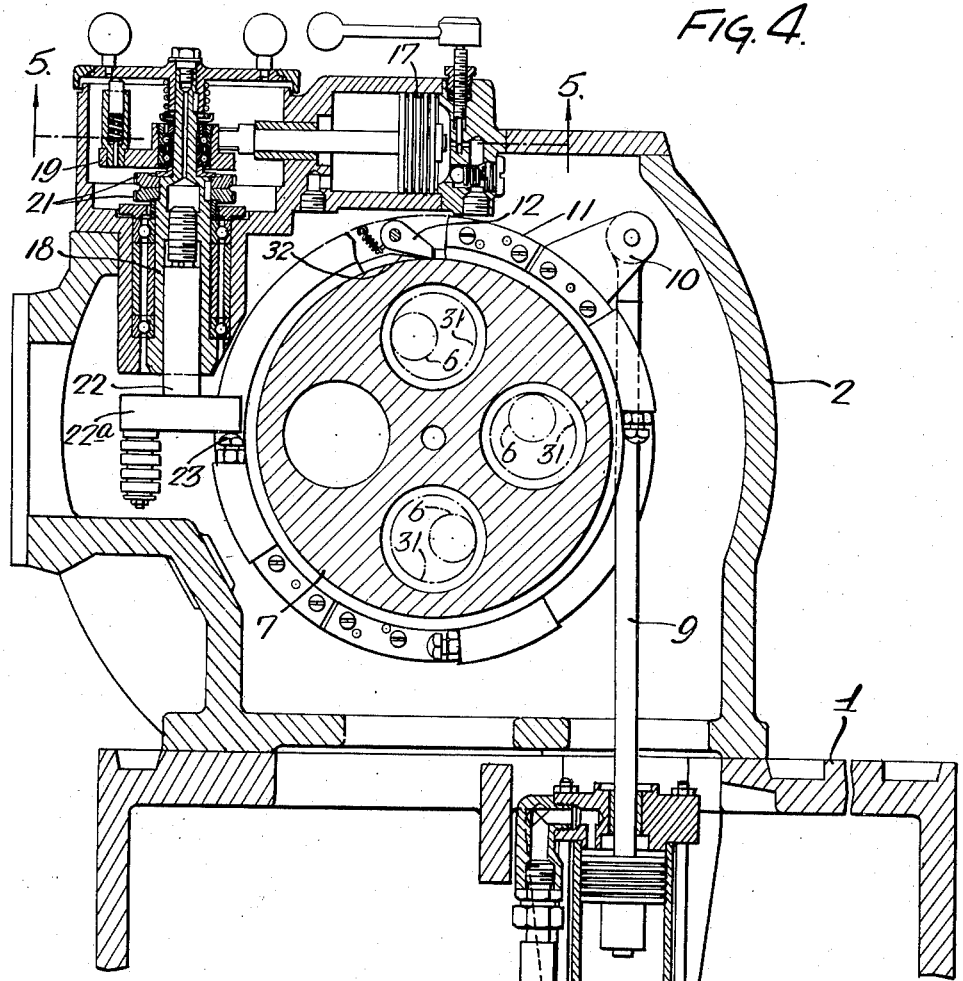
Figure 5:
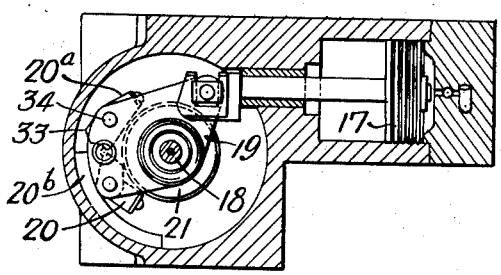

The invention is described in the following in connection with the accompanying drawings, which show a machine according to the invention for the internal grinding of the inner race rings of ball bearings. Fig. 1 is a side view of the machine according to the invention and Fig. 2 is a plan view of the same machine. Fig. 3 is a longitudinal section through a part of the machine and Fig. 4 a section along the line IV—IV in Fig. 2. Fig. 5 is a section along the line V—V in Fig. 4. Fig. 6 shows partly in section certain parts of the driving mechanism and Fig. 7 finally is a simplified section along the line VII—VII of Fig. 6.

The machine illustrated in the drawings comprises a frame 1 on which is mounted a carriage 2 in which are carried four work spindles 3, and a tool carriage, this being a reciprocating slide 4, upon which is mounted a motor 5 for driving three grinding wheels 6 (Fig. 4) in any well-known manner. The work spindles 3 are mounted on a rotatable drum 7, which is adapted to be turned stepwise substantially one fourth of a revolution at a time. For this purpose there is provided, as shown in Fig. 4, a hydraulic servo-motor device 8, having a piston rod 9, connected to an arm 10, projecting from a ring 11, surrounding the drum 7. The ring 11 carries a pawl 12, which is adapted to cooperate with corresponding notches in the periphery of the drum 7, so that the drum will be turned substantially one fourth of a revolution at each stroke of the servo-motor 8.

The work spindles 3 are adapted to be driven by an electric motor 13 (Fig. 6) through a chain drive 14, which, as is apparent from Fig. 7, drives three of the four work spindles 3. These spindles are mounted equidistant from the axis of rotation of the drum 7, and evenly spaced at angles of 90° from each other. From Fig. 7 it is apparent, that after each movement of one fourth revolution of the drum 7, one of the work spindles 3 will be caused to assume the position shown at the left of the figure where it will thus be out of engagement with the chain and will remain stationary. As has been mentioned above the slide 4 is reciprocable and means of known type are provided so that the slide 4 with the grinding wheels will be moved away from the work spindle carriage 2 before the drum 7 is turned, whereupon it is again advanced to the working position after the completion of the revolving movement. It is thus apparent that each work piece carried by the work spindles will in turn be subjected to the action of all three of the grinding wheels 6.

In addition to the above mentioned movement of the slide 4 necessary for changing positions, the slide is caused to reciprocate when in working position, being given an oscillating movement of relatively small amplitude corresponding to the axial dimensions of the rings being worked upon. For this purpose, there is provided an electric motor 15 which through a belt drive, bevel gears etc. drives a crank device 16, shown diagrammatically in Fig. 1.

For the feed required to enable the grinding wheels 6 to work upon the work pieces means are provided which, after the turning of the drum 7 described above, cause the drum to carry out a certain further turning movement to feed the work pieces towards the grinding wheels. This device is illustrated in Figs. 4 and 5. For this purpose there is provided a piston 17 adapted to be acted upon by a pressure medium. This piston is connected to a lever 19 mounted on a shaft 18, carrying two pawls 20 and 20a. These pawls cooperate with a corresponding toothed wheel 21 on the shaft 18. This latter is tubular at its lower end and is threaded internally to cooperate with a shaft 22. The shaft 22 carries at its lower end a stop member 22a, adapted to cooperate with adjustable stop members 23 at the periphery of the drum. The whole is arranged so that the piston 17 moves to the end position, shown in the figures, when the grinding wheels 6 have been advanced to their grinding positions, whereby the shaft 18 is turned by the action of the pawl 20 and lifts the stop member 22a, whereby the drum 7 is turned by the servo-motor 8 a further small angle corresponding to the feed movement. Thereafter the shaft 22 is turned about its own axis together with the sleeve 18 by means not shown, and thus removes the stop member 22a from the stop member 23, after which the drum is turned substantially 90° and the cycle is repeated. In connection with this turning movement of the drum, the piston 17 returns to its original position and the shaft 18 is returned to its original position by the other pawl, so that the stop member 22a is again lowered. The pawl 20a is retained by means of a cam device 20b or the like, which engages an elevation 33 on the pawl and turns the pawl about its pivot 34, in raised position from its toothed wheel 21 under part of the return movement, whereby the shaft 18 will be turned back a smaller angle than that which corresponds to its rotation in the opposite direction. In this manner the stop member 22a will be successively moved upwards and the above mentioned difference in the angle of revolution between the forwards and backwards turning of the shaft 18 is so adjusted that the successive movements upwards of the stop member 22a, correspond to the wear on the grinding wheels.

In the position shown in Fig. 4 the work spindle 3 at the left hand side of the figure is at rest between the two parts of the chain 14. During the period when the work pieces in the three other spindles are being worked upon, the work piece in the spindle 3 is changed. As is apparent from Fig. 4, each spindle 3 carries a suitable chuck 30, which accommodates two rings 31, which for the sake of clearness have been shown on a larger scale in Fig. 4 than in Fig. 3, as is also the case with the grinding wheels 6. For each chuck 30 there is provided a bore gauge 24, located within the spindle 3. These bore gauges are movable in an axial direction, but are maintained by devices not shown in a position removed from the ring 31, except when the corresponding spindle assumes the position corresponding to the lower spindle 3 in Fig. 4, in which position the final operation on the rings 31 is carried out. In this position the gauge 24 is caused to reciprocate in time with the movements of the slide 4, as shown for example in United States Patent 1,497,574, so that the grinding wheels 6 cannot come into contact with the gauge. As soon as the bore of the rings has reached the desired diameter, so that the gauge 24 can enter the rings, the movements required for changing the positions are automatically caused to take place in a manner not shown, whereby the finished rings may be removed and new rings introduced in the momentarily stationary chuck. The finished rings may be removed and new rings inserted either by hand or by any known type of device suitable for this purpose.

As is clearly shown in Fig. 4, the three grinding wheels 6 will in turn work on the rings in the chucks. Since the drum turns a predetermined angle under the above mentioned feed movement, which follows upon the turning of the drum one quarter of a revolution, the amount of feed will be equal at all three grinding positions. If it is assumed that all three grinding wheels are alike and so adjusted that they gauge the work pieces simultaneously during the feed movement, it is apparent that the grinding wheels will all cause equal diameter changes, i. e. that the total amount of metal removed will be divided substantially equally one third for each grinding wheel. If the work accomplished by the first grinding wheel is less than that calculated on for any reason, for example because of wear on the grinding wheel, the amount of material removed by the next grinding wheel will be somewhat greater than normal, which in its turn causes a greater wear on this grinding wheel, whereby the third grinding wheel must take over a greater amount of the work. In this manner, the distribution of the work between the three grinding wheels is equalized. It is thus apparent that if, when new grinding wheels are mounted and adjusted, a slight difference occurs, for instance with regard to the diameters of the grinding wheels, this difference would be automatically corrected during the work. It is also possible to use grinding wheels of different qualities in the three grinding positions, whereby both the amount of work done per spindle and the quality of the finished surface can be varied.

Due to the fact that work takes place simultaneously at all three spindles, it should be theoretically possible to obtain three times the capacity of a single-spindle machine, at the same time retaining the rate of feed of the single-spindle machine. In order to raise the quality of the finished product, it is however possible to use a relatively low rate of feed, resulting in less bending of the spindles, which in turn results in greater precision. The fact that the amount of material removed by each grinding wheel is only a fraction of the total amount of material removed, results in itself in a smaller degree of bending of the spindles as compared with the single-spindle machine.

I claim:

1. A machine tool, especially a grinding machine for working on rotating work pieces, a carriage for work spindles comprising a rotatable drum, a plurality of work spindles mounted in said drum, a tool carriage comprising a slide reciprocable in a direction parallel to the rotational axis of the drum towards and from the work spindle carriage, a plurality of tool holders mounted on the slide in positions fixed relative to each other for simultaneously working on a plurality of work pieces carried on the respective work spindles, means for revolving the drum stepwise to bring the work pieces in turn into working position relative to each of the tools, and means for effecting a further revolving movement of the drum through a slight angle and at a reduced speed after each said stepwise movement to cause a relative feeding movement of the work pieces relative to the respective tools in a direction substantially normal to the reciprocatory paths of the latter.

2. A machine tool according to claim 1 characterized thereby that the number of spindles is at least one more than the number of tools so that in each of the stepwise positions of the drum one of the work spindles is left free for replacement of the work piece therein.

3. A machine tool according to claim 1 characterized thereby that all tools are grinding wheels rotatable in planes normal to the reciprocatory paths of the tools.

4. A machine tool according to claim 1 including means for reciprocating the tool holder slide to retract the tools from the work prior to each stepwise revolution of the drum and for again advancing the slide to engage the tools with the work pieces after completion of each such stepwise movement of the drum.

References Cited in the file of this patent

UNITED STATES PATENTS

| | | |
|---|---|---|
| 1,203,844 | Booth | Nov. 7, 1916 |
| 1,990,469 | Bryant | Feb. 12, 1935 |
| 2,224,265 | Johnson | Dec. 10, 1940 |
| 2,389,668 | Johnson | Nov. 27, 1945 |
| 2,628,413 | Hallenbeck | Feb. 17, 1953 |